(12) United States Patent
Chaen et al.

(10) Patent No.: US 6,432,470 B2
(45) Date of Patent: *Aug. 13, 2002

(54) METHOD AND COMPOSITION FOR IMPROVING THE AFTERTASTE OF SUCROSE

(75) Inventors: Hiroto Chaen; Masakazu Mitsuhashi; Toshio Miyake, all of Okayama (JP)

(73) Assignee: Kabushiki Kaisha Hayashibara Seibutsu Kagaku Kenkyujo, Okayama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,452

(22) Filed: Apr. 24, 1998

(30) Foreign Application Priority Data

Jun. 2, 1997 (JP) ............................................. 9-157321
Nov. 7, 1997 (JP) ............................................. 9-320519

(51) Int. Cl.[7] ................................................. C07H 3/04

(52) U.S. Cl. ................................... 426/658; 536/123.13

(58) Field of Search ..................... 536/123.13; 426/658, 426/548; 127/30

(56) References Cited

FOREIGN PATENT DOCUMENTS

| EP | 0289138 | 2/1988 |
|---|---|---|
| EP | 0289138 | 11/1988 |
| EP | 0619951 | 10/1994 |
| EP | 0622025 | 11/1994 |
| EP | 0628630 | 12/1994 |
| EP | 0636693 | 2/1995 |
| JP | 6144476 | 6/1980 |
| JP | 58216695 | 12/1983 |
| JP | 577381 | 3/1986 |
| JP | 63240784 | 10/1988 |
| JP | 6319486 | 11/1994 |
| JP | 789916 | 4/1995 |
| JP | 7170977 | 7/1995 |
| JP | 7213283 | 8/1995 |

OTHER PUBLICATIONS

Abstract of Japanese patent 09–173 017, Jul. 1997.
Abstract of Japanese patent 08–256 694, Feb. 1997.
Abstract of Japanese patent 08–298 932, Mar. 1997.

*Primary Examiner*—Keith Hendricks
(74) *Attorney, Agent, or Firm*—Browdy and Neimark

(57) ABSTRACT

A method for improving the aftertaste of sucrose without lowering the sweetening power of sucrose, which comprises incorporating trehalose into sucrose in an amount of 2–12% to the sucrose, on a dry solid basis. The method produces saccharide compositions and food products having improved aftertaste of sucrose without lowering the sweetening power of sucrose.

5 Claims, No Drawings

METHOD AND COMPOSITION FOR IMPROVING THE AFTERTASTE OF SUCROSE

BACKGROUND OF THE INVENTION

1. Field of the Invention

The present invention relates to a method for improving the aftertaste of sucrose and uses thereof, and more particularly to a method for improving the aftertaste of sucrose characterized in that it comprises incorporating trehalose into sucrose in an amount of 2–12 w/w % to the sucrose, on a dry solid basis (d.s.b.), and saccharide compositions and food products, wherein the aftertaste of sucrose is improved by using the method without lowering the sweetening power of sucrose.

2. Description of the Prior Art

Sucrose, a natural sweetener used for a long time, has become to be noticed of its thick taste, which is a main drawback, which causes an unpleasant long-lasting aftertaste, in modern diet styles flooded with food materials and fast foods.

To improve the drawback, for example, Japanese Patent Kokoku No. 44,476/86 proposed a method for improving the aftertaste of sucrose by treating sucrose solutions with ultrasound; the method is scarcely used because of its relatively-low effect for its complexity. The use of a combination of sucrose with other saccharides such as maltose, trehalose, and maltotetraose is known in the food industries as disclosed, for example, in Japanese Patent Kokai No. 319,486/94 and Japanese Patent Kokoku Nos. 77,381/93 and 89,916/95. These other saccharides are low-sweetened sweeteners with a reduced sweetening power of sucrose. On the pretext of fitting to modern feelings, these conventional methods aim to lower the content of sucrose in food products in order to reduce the sweetening power as much as possible and increase the content of total saccharides as high as possible within the margin of the reduced sweetening power, resulting in a relatively-long shelf-life of the food products. Usually, the other saccharides are added to sucrose in an amount of about 40–300 w/w % to the sucrose, d.s.b. In some cases, such use of sucrose hinders the effective high-sweetening power of sucrose, and in many cases, it deteriorates the flavor and taste of sucrose. It has been strongly demanded to improve the aftertaste of sucrose as a drawback while retaining the sweetening powder, flavor, and taste.

SUMMARY OF THE INVENTION

The object of the present invention is to provide a method for improving the aftertaste of sucrose due to its thick taste without substantially lowering the sweetening power of sucrose, and uses thereof.

To attain the above objects, the present inventors energetically studied for the combination use of sucrose and other saccharides. As a result, they unexpectedly found that the present object is attained by incorporating trehalose, α,α-trehalose, into sucrose in a specific proportion, and accomplished this invention; the inventors found that incorporation of trehalose into sucrose in an amount of 2–12 w/w % (hereinafter the wording "w/w %" is abbreviated as "%" throughout the specification, unless specified otherwise) to the sucrose, d.s.b., eliminates the thick taste and aftertaste of sucrose without substantially lowering the sweetening power of sucrose, and they accomplished this invention which is mainly constructed by:

(1) A method for improving the aftertaste of sucrose, characterized by incorporating trehalose into sucrose in an amount of 2–12% to the sucrose, d.s.b.;

(2) A saccharide composition which contains trehalose in an amount of 2–12% to sucrose, d.s.b.;

(3) A food product with improved aftertaste of sucrose without lowering the sweetening power of sucrose, where trehalose is incorporated into sucrose in an amount of 2–12% of the sucrose, d.s.b., without substantially lowering the sweetening power of sucrose; and (4) An agent for improving the aftertaste of sucrose, which comprises trehalose as an effective ingredient.

DETAILED DESCRIPTION OF THE INVENTION

Any types and forms of sucrose can be used in the present invention independently of their origins as long as the present invention improves their taste quality, particularly, their aftertaste. For example, white sugars, granulated sugars, white superior soft sugars, powdered sugars, frosted sugars, and liquid sugars can be used. Saccharides comprising sucrose and other saccharides can be also used. In general, those rich in sucrose can exert more easily the effect of the present invention, and the following saccharide compositions can be advantageously used in the present invention; black sugars containing sucrose and small amounts of invert sugars and minerals, α-galactosyl sucrose such as raffinose and stachyose, saccharides containing sucrose, α-glycosyl sucrose such as erlose and maltosylsucrose, saccharides containing maltooligosaccharides and sucrose, i.e., "COUPLING SUGAR ®, β-galactosylsucrose, i.e., lactosucrose, and saccharides containing lactose and sucrose, i.e., NYUKAOLIGO ®".

Any types and forms of trehalose can be used in the present invention independently of their origins as long as they can improve the flavor and taste of sucrose, particularly, the aftertaste of sucrose. For example, trehalose derived from starches as disclosed in Japanese Patent Kokai Nos. 319,486/94 and 213,283/95, and trehalose from maltose as disclosed in Japanese Patent Kokai Nos. 216,695/83 and 170,977/95 can be advantageously used. The sweetening power of trehalose is known to be about 45% of the sweetening power of sucrose and is not changed independently of the form of a crystalline hydrate, crystalline anhydride, powder, and liquid. The form of trehalose can be appropriately chosen as the occasion demands. Trehalose can be advantageously used as an effective ingredient for agents for improving the aftertaste of sucrose.

To attain the present object, trehalose should be incorporated into sucrose in an amount of 2–12% to the sucrose, d.s.b. If the content is below 2%, d.s.b., it improves insufficiently the aftertaste of sucrose, while if the content is over 12%, d.s.b., it unsatisfactorily reduces the sweetening power of sucrose. As long as it does not inhibit the present object, other saccharides excluding sucrose and trehalose can be coexisted: For example, monosaccharides such as glucose, fructose, and galactose; disaccharides such as maltose, isomaltose, lactose, and palatinose; trisaccharides such as maltotriose, erlose, raffinose, lactosucrose, and ketose; tetrasaccharides such as maltotetraose and stachyose; and sugar alcohols such as xylitol, sorbitol, maltitol, lactitol, and maltotriitol, all of which are appropriately chosen, particularly, saccharide compositions containing oligosaccharides having a sucrose structure can be advantageously used. The present saccharide compositions thus obtained contain trehalose in an amount of 2–12% to sucrose, d.s.b. The higher the content of sucrose, the more easily exerted the present effect; Preferably, those containing at least 10%, and more preferably, at least 40% sucrose, d.s.b., can be suitably used independently of their forms of solid, paste, and liquid.

The present saccharide compositions thus obtained have a satisfactorily improved aftertaste of sucrose free from the reduction of sweetening power, and they can be arbitrarily and widely used to sweeten food products. Specifically, the saccharide compositions exert their effect in food products which contain relatively-large amounts of the compositions, and preferably they can be advantageously used in food products containing at least 30% of the compositions, d.s.b.: For example, seasonings such as sweeteners, table sugars, coffee sugars, "mentsuyu" (a sauce for Japanese vermicelli), sauces, catsups, "yakiniku-no-tare" (a sauce for Japanese grilled meat), instant soup mixes, and complex seasonings.; Japanese confectioneries and material saccharides thereof such as an (a bean jam), "uiro" (a sweet rice jelly), "yokan" (a sweet jelly of beans), jellies, "kingyoku" (a kind of jelly), pao de Castellas, and "amedama" (a Japanese toffee); Western confectioneries and material saccharides thereof such as buns, cookies, pies, puddings, chewing gums, chocolates, sand creams, custard creams, butter creams, cream puffs, wafers, sponge cakes, flour pastes, peanut pastes, candies, spreads, "toka" (conserves), syrups, bonbons, and sweetened condensed milks; soft drinks and material saccharides thereof such as coffees, cocoas, teas, juices, sour milk beverages, and beverages containing lactic acid bacteria; ice candies and material saccharides thereof such as ice creams, sherbets, "kaki-gori", and "kori-mitsu"; instant food products and material saccharides thereof such as instant juices, instant coffees, instant cocoas, instant teas, instant "shiruko", and instant puddings; and other food products such as foods for infants, therapeutic foods, beverages with supplemental nutritions, dried foods, and "chinmi" which are sweetened with the present saccharide compositions.

When using powdered sucrose as sucrose in the process for producing the present saccharide compositions, the addition of powdery trehalose to the powdered sucrose in an amount of 2–12% to the powdered sucrose, d.s.b., improves the aftertaste of sucrose without substantially lowering the sweetening power of sucrose and exerts solidification-preventing effect on the powdered sucrose.

The powdery saccharide compositions which are prevented from solidification can be advantageously used in food products in general and used as material saccharides in chewing gums, chocolates, sand creams, icings, sugar coatings, and toppings, all of which prefer powdery saccharides.

Methods for incorporating the present saccharide compositions in the aforesaid food products are those which can incorporate thereunto the saccharide compositions during the processes before completion of their processings; conventional methods such as mixing, kneading, dissolving, melting, soaking, permeating, sprinkling, applying, coating, spraying, injecting, crystallizing, and solidifying can be appropriately chosen. If necessary, other materials including appropriate materials and additives such as different sweeteners, taste-imparting seasonings, flavoring agents, coloring agents, emulsifiers, nutrients, antioxidants, and fillers can be arbitrarily incorporated into food products in adequate amounts.

The following experiments describe the present invention:

Experiment 1

Influence of Saccharides on Both the Sweetening Power and the Improvement of the Aftertaste of Sucrose The influence of coexisting saccharides on both the sweetening power and the improvement of the aftertaste of sucrose was studied. The saccharides used were commercially available ones in reagent grade. A 10% aqueous sucrose solution was used as a control solution, and a 10% aqueous solution containing 10% each of the saccharides, d.s.b., was used as a test solution. The saccharides were glucose, sorbitol, maltose, maltitol, lactose, trehalose or α,α-trehalose, and neotrehalose or α, β-trehalose. A panel test was conducted using the paired difference test which compared the sweetening power and aftertaste of sucrose in the control and test solutions. The panel test was conducted at a room temperature of 25° C. using 13 volunteers consisting of eight males and five females. The sweetening power was evaluated by allowing the volunteers to compare the test solution with the control solution and to select their answers among the grades "inferior", "equal" and "superior", while the improvement of the aftertaste of sucrose was evaluated by allowing the volunteers to compare the test solution with the control solution and to select their answers among the grades "inferior", "equal" and "superior", followed by counting the number of volunteers who selected the grades each. The results are in Table 1:

TABLE 1

| Saccharide coexisted in sucrose | Grade | Sweetening power | Aftertaste | Judgement |
| --- | --- | --- | --- | --- |
| Glucose | C > T | 11 | 1 | Control |
|  | C = T | 2 | 10 |  |
|  | C < T | 0 | 2 |  |
| Sorbitol | C > T | 11 | 1 | Control |
|  | C = T | 2 | 11 |  |
|  | C < T | 0 | 1 |  |
| Maltose | C > T | 13 | 1 | Control |
|  | C = T | 0 | 10 |  |
|  | C < T | 0 | 2 |  |
| Maltitol | C > T | 9 | 2 | Control |
|  | C = T | 4 | 9 |  |
|  | C < T | 0 | 2 |  |
| Lactose | C > T | 13 | 1 | Control |
|  | C = T | 0 | 11 |  |
|  | C < T | 0 | 1 |  |
| Trehalose (α,α-trehalose) | C > T | 2 | 0 | Present invention |
|  | C = T | 10 | 1 |  |
|  | C < T | 1 | 12 |  |
| Neotrehalose (α,β-trehalose) | C > T | 13 | 2 | Control |
|  | C = T | 0 | 9 |  |
|  | C < T | 0 | 2 |  |

Note: In the table, the numerals are the number of volunteers among 13, who selected the grades each. The symbols "C > T", "C = T", and "C < T" mean that the test solution was inferior to, equal to, and superior to the control solution with only sucrose.

As evident from the results in Table 1, it was revealed that unlike the sucrose solutions in which other saccharides were present, the solutions, in which trehalose or α,α-trehalose coexisted with sucrose, had satisfactorily-improved aftertaste of sucrose or a sharpened aftertaste of sucrose. The coexistence of saccharides other than trehalose lowered the sweetening power of sucrose but could not improve the aftertaste of sucrose with respect to the sharpness. The data shows that trehalose improves the sharpness of aftertaste of sucrose without substantially lowering the sweetness of sucrose, and the effect is characteristic of trehalose.

Experiment 2
Influence of the Concentration of Trehalose On Both the Sweetening Power and the Improvement of the Aftertaste of Sucrose The influence of the concentration of trehalose on both the sweetening power and the improvement of the aftertaste of sucrose was studied with an aqueous solution, coffee, and tea. Similarly as the method in Experiment 1, commercially available sucrose and trehalose in reagent grade were used.

In the case of an aqueous solution, a 10 w/v % aqueous solution containing a saccharide composition, containing sucrose and 1.0, 2.0, 5.0, 8.0, 12.0, 16.0 or 20.0% trehalose to the sucrose, d.s.b., was used as a test solution. As a control solution, a 10 w/v % sucrose solution with only the saccharide was used. These test and control solutions with ambient temperature were used in a panel test.

In the case of a coffee as a test solution, commercially available regular coffee powder was extracted in a conventional manner, and in the extract was dissolved 10 w/v % either of the saccharide compositions having the same proportions of sucrose and trehalose as used in the aqueous solution. As a control solution, a 10 w/v % sucrose solution with only the saccharide was used. These test and control solutions in hot conditions were used in a panel test.

In the case of a tea as a test solution, commercially available tea bag was extracted in usual manner, in which was dissolved 5 w/v % either of the saccharide compositions having the same proportions of sucrose and trehalose as used in the aqueous solution. As a control solution, a 5 w/v % sucrose solution with only the saccharide was used. These test and control solutions in hot conditions were used in a panel test.

Similarly as in Experiment 1, a panel test was conducted using the paired difference test for evaluating the sweetening power and the improvement of the aftertaste of sucrose.

The results are in Table 2:

As can be seen from the results in Table 2, it was revealed that the coexistence of trehalose in an amount from 2.0% to 12.0% to sucrose, d.s.b., independently of aqueous solution, coffee, and tea, improves the aftertaste of sucrose, i.e., the sharpness of the aftertaste of sucrose without substantially lowering the sweetening power of sucrose.

Experiment 3
Solidification-preventing Activity of Trehalose on Powdered Saccharides The solidification-preventing activity of powdery trehalose on a powdery saccharide or a powdered sucrose was studied. One hundred parts by weight of the powdered saccharide or the powdered saccharide, which 90% or higher passes through a JIS 250μ sieve, prepared by pulverizing granulated sugar, and 10 parts by weight of powdery trehalose prepared by heating "TREHAOSE®", a food grade crystalline trehalose hydrate commercialized by Hayashibara Shoji, Inc., Okayama, Japan, to convert it into an anhydrous crystalline form, and pulverizing the anhydride similarly as in the above granulated sugar, were mixed to homogeneity to obtain a saccharide composition containing trehalose in an amount of about 10% to sucrose, d.s.b. Twenty-kilogram aliquots of the saccharide composition were in a conventional manner injected into polyethylene bags which were then closed with rubber bands and placed onto three-layered Kraft paper, followed by sewing the edges of the paper by a machine to enclose the bags for test samples. Five bags of the test samples were placed on a pallet in one layer and loaded with a pallet loaded with 50 bags, one ton total, containing 20 kg food grade trehalose each, followed by storing for one month at ambient temperature. As a control, only the powdered sugar or the powdered sucrose was injected into bags similarly as above and stored. After one-month standing, these bags were opened for examining the conditions of the contents, revealing that the powdered saccharide as the control solidified rigidly but the present saccharide composition remained a

TABLE 2

| Trehalose content (%) to sucrose, on a dry solid basis | Grade | Aqueous solution* A | B | Coffee in hot A | B | Tea in hot A | B | Judgement |
|---|---|---|---|---|---|---|---|---|
| 1.0 | C > T | 1 | 2 | 2 | 3 | 1 | 4 | Control |
|  | C = T | 11 | 8 | 10 | 7 | 10 | 7 |  |
|  | C < T | 1 | 3 | 1 | 3 | 2 | 2 |  |
| 2.0 | C > T | 1 | 1 | 1 | 1 | 1 | 0 | Present |
|  | C = T | 10 | 2 | 11 | 2 | 11 | 2 | invention |
|  | C < T | 2 | 10 | 1 | 10 | 1 | 11 |  |
| 5.0 | C > T | 0 | 1 | 0 | 1 | 0 | 0 | Present |
|  | C = T | 11 | 2 | 11 | 1 | 10 | 0 | invention |
|  | C < T | 2 | 10 | 2 | 11 | 3 | 13 |  |
| 8.0 | C > T | 2 | 0 | 1 | 0 | 0 | 0 | Present |
|  | C = T | 10 | 1 | 11 | 1 | 13 | 2 | invention |
|  | C < T | 1 | 12 | 1 | 12 | 0 | 11 |  |
| 12.0 | C > T | 2 | 0 | 1 | 0 | 2 | 1 | Present |
|  | C = T | 10 | 2 | 12 | 1 | 10 | 2 | invention |
|  | C < T | 1 | 11 | 0 | 12 | 1 | 10 |  |
| 16.0 | C > T | 4 | 0 | 4 | 1 | 2 | 2 | Control |
|  | C = T | 9 | 1 | 8 | 3 | 9 | 3 |  |
|  | C < T | 0 | 12 | 1 | 9 | 2 | 8 |  |
| 20.0 | C > T | 9 | 0 | 11 | 1 | 4 | 2 | Control |
|  | C = T | 4 | 0 | 2 | 4 | 7 | 4 |  |
|  | C < T | 0 | 13 | 0 | 8 | 2 | 7 |  |

Note: In the table, the numerals are the number of volunteers among 13, who selected the grades each. The symbols "*", "A" and "B" mean "ambient temperature", "sweetening power" and "aftertaste", respectively. The symbols "C > T", "C = T", and "C < T" mean that the test solution was inferior to, equal to, and superior to the control solution with only sucrose.

free-flowing powder, which scarcely solidified but easily collapsed only by hand shaking. Thus, it was revealed that the saccharide compositions according to the invention have an improved aftertaste of sucrose without lowering the sweetening power of sucrose and exert a solidification-preventing effect.

Examples A and B disclose the preferred embodiments of the saccharide compositions and food products according to the present invention, respectively:

EXAMPLE A-1

A saccharide composition was obtained by mixing to homogeneity 100 parts by weight of white superior soft sugar with 10 parts by weight of "TREHAOSE®", a food grade crystalline trehalose hydrate commercialized by Hayashibara Shoji, Inc., Okayama, Japan, which was equal to about 9% of the sucrose, d.s.b., with respect to the trehalose content. The product, having improved aftertaste of sucrose without lowering the sweetening power, can be arbitrarily used to sweeten food products.

EXAMPLE A-2

One hundred parts by weight of granulated sugar was placed in a fluidized-bed granulator which was then set to give a blowing air temperature of 40° C., followed by granulating the contents while being sprayed with 10 parts by weight of 50% aqueous trehalose solution, which was equal to about 5% of the sucrose, d.s.b., with respect to the trehalose content. The granulated contents were transferred to an aging tower and aged at 25° C. for eight hours into a saccharide composition. The product, a stable and free-flowing saccharide composition of granulated sugar coated with trehalose, improved the sharpness of aftertaste of sucrose without lowering the sweetening power so that it can be arbitrarily used in food products.

EXAMPLE A-3

A saccharide composition was obtained by pulverizing a granulated sugar into a powdered sugar, i.e., a powdered sucrose which 90% or more passes through a JIS 250μ sieve, and mixing to homogeneity 100 parts by weight of the powdered sugar with five parts by weight of a powered trehalose, which was equal to about 5% of the sucrose with respect to the trehalose content, d.s.b., and obtained by heating "TREHAOSE®", a food grade crystalline trehalose hydrate, to convert it into an anhydrous form, and pulverizing the crystalline trehalose anhydride similarly as the above granulated sugar. Since the product improved the sharpness of aftertaste of sucrose without lowering the sweetening power of sucrose, it can be arbitrarily used to sweeten food products and suitably used in chewing gums, chocolates, and sand creams as a material saccharide, a powdered saccharide free of solidification and having satisfactory free-flowing ability.

EXAMPLE A-4

A liquid saccharide composition was obtained by mixing and dissolving one part by weight of "TREHAOSE®", a food grade crystalline trehalose hydrate, which was equal to about nine percent of sucrose with respect to the trehalose content, d.s.b., with and in 100 parts by weight of "COUPLING SUGAR®", a liquid saccharide composition, containing erlose and sucrose and having about 25% moisture and about 14% sucrose, d.s.b., commercialized by Hayashibara Shoji, Inc., Okayama, Japan. Compared with the material liquid saccharide composition, the product thus obtained succeeded in improving the aftertaste inherent to sucrose in the product without altering the sweetening power of sucrose. Therefore, the product can be arbitrarily used to sweeten food products and used as a relatively-low dental-caries-inducing sweetener.

EXAMPLE A-5

A liquid saccharide composition was obtained by mixing and dissolving 1.4 parts by weight of "TREHAOSE®", a food grade crystalline trehalose hydrate, which was equal to about 10% of the sucrose below with respect to the trehalose, d.s.b., with and in 100 parts by weight of NYUKAOLIGO®", a liquid saccharide composition containing lactosucrose and sucrose and having about 25% moisture and about 17% sucrose, d.s.b., commercialized by Hayashibara Shoji, Inc., Okayama, Japan. Compared with the material liquid saccharide composition, the product thus obtained succeeded in improving the aftertaste inherent to sucrose without lowering the sweetening power of sucrose. Therefore, the product can be arbitrarily used to sweeten food products and used as a saccharide for promoting the growth of bifid bacteria and for promoting the absorption of minerals in living bodies.

EXAMPLE A-6

In 94 parts by weight of a 66 w/v % sucrose solution was dissolved by heating six parts by weight of "TREHAOSE®", a food grade crystalline trehalose hydrate, to obtain a liquid saccharide solution containing about 67 w/v % of sucrose and trehalose. The product is a stable and easily-handleable liquid saccharide and is free from solidification of sucrose and trehalose even at ambient temperature. The product can be arbitrarily used to sweeten food products because it has improved sharpness of aftertaste of sucrose without lowering the sweetening power of sucrose.

EXAMPLE B-1

Sweetener

One part by weight of a saccharide composition, obtained by the method in Example A-1, was mixed to homogeneity with 0.01 part by weight of "αG SWEET", α-glycosyl stevioside commercialized by Toyo Sugar Refining Co., Ltd., Tokyo, Japan, and 0.01 part by weight of "ASPARTAME", L-aspartyl-L-phenylalanine methyl ester, and the mixture was subjected to a granulator to obtain a granulated sweetener. The product has satisfactory quality of sweetness and favorable sharpness of aftertaste, as well as having three times higher sweetening power of sucrose and about one third lower calorific value of sucrose per sweetening power. Thus, the product can be favorably used as a relatively-low calorific sweetener for sweetening low-calorific food products for fat persons and diabetics who are restricted in calorie intake.

EXAMPLE B-2

Canned Coffee

One hundred parts by weight of roasted coffee beans was pulverized and extracted with about 1,000 parts by weight of heated water to obtain about 860 parts by weight of an extract. An about 450 parts by weight of the extract was mixed to homogeneity with 80 parts by weight of a saccharide composition, obtained by the method in Example A-2, and about 550 parts by weight of water containing an adequate amount of sodium bicarbonate to obtain a coffee with a pH of about 7. The coffee was in a conventional manner injected into cans and sterilized by heating at 120°

EXAMPLE B-3

Chewing Gum

Three parts by weight of gum base was heated and melted by heating up to be softened, admixed with five parts by weight of a saccharide composition, obtained by the method in Example A-3, and two parts by weight of crystalline maltitol anhydride, then further mixed with adequate amounts of a flavor and coloring agents. The mixture thus obtained was kneaded by a roll, shaped, and packaged into the desired product. The product is a chewing gum having satisfactory texture, flavor, and taste.

EXAMPLE B-4

Chocolate

Forty parts by weight of cacao paste, 10 parts by weight of cacao butter, 45 parts by weight of granulated sugar or sucrose, and five parts by weight of "TREHAOSE®", a food grade crystalline trehalose hydrate, which was equal to about 10% of the sucrose, d.s.b., were passed through a refiner to lower the granule size of the contents, placed in a conche, and kneaded up at 50° C. for two days and nights. During the kneading step, 0.05 part by weight of lecithin was added to the contents and sufficiently kneaded and dispersed. The resulting product was set to 31° C. by a thermoregulator, poured into a mold just before solidifying the butter, deaerated by a vibrator, and passed through a 10° C. cooled tunnel over about 20 min to solidify the contents. The solidified contents were removed from the mold and packaged into the desired product which has substantially no hygroscopicity but has a satisfactory color, gloss, and internal tissue, and mildly melts in your mouth to give favorable sweetness, flavor, taste, and sharpness of aftertaste.

EXAMPLE B-5

Sweetened Condensed Milk

In 100 parts by weight of fresh milk were dissolved one part by weight of a saccharide composition obtained by the method in Example A-1, and three parts by weight of a liquid saccharide composition obtained by the method in Example A-5, and the solution was sterilized by heating on a plate heater, concentrated up to give a concentration of 70%, and sterilely canned. The product has high-quality sweetness, flavor, taste, and sharpness of aftertaste, and it can be used to sweeten foods for infants, fruits, coffees, cocoas, and teas.

EXAMPLE B-6

An (a Bean Jam)

Ten parts by weight of material red beans was in a conventional manner boiled after mixed with water, followed by removing astringency, harshness, and water-soluble impurities to obtain an about 21 parts by weight of "azuki-tsubu-an" (a red bean jam with unpasted red beans). The an was mixed with 14 parts by weight of white superior soft sugar, 11 parts by weight of "TREHAOSE®", a food grade crystalline trehalose hydrate, which was equal to about seven percent of the sucrose, d.s.b., and four parts by weight of water. The mixture was heated, mixed with a small amount of salad oil, and kneaded up into an about 35 parts by weight of the desired product with unpasted red beans. The product has substantially no fading of color but has palatable taste, as well as high-quality sweetness, flavor, taste, and sharpness of aftertaste. Thus, it can be suitably used as a material for bean-jam-buns, manju (a Japanese confectionery), dumplings, monaka (a bean-jam-filled wafer), ice creams, and sherbets.

EXAMPLE B-7

Custard Cream

One hundred parts by weight of corn starch, 100 parts by weight of a saccharide composition obtained by the method in Example A-6, 100 parts by weight of maltose, and one part by weight of salt were sufficiently mixed, and the mixture was admixed with 280 parts by weight of fresh eggs, followed by stirring. To the resulting mixture was gradually added 1,000 parts by weight of boiling milk and continued stirring over fire, then the heating was stopped when the whole contents completely gelatinized and became semi-transparent, followed by cooling the mixture, adding thereto an adequate amount of a vanilla flavor, then weighing, injecting and packing the contents to obtain the desired product. The product has smooth gloss, mild sweetness and taste, and the retrogradation is satisfactorily inhibited, resulting in a long shelf-life by a large margin.

Effect of the Invention

As evident from the above, the present invention improves the aftertaste of sucrose without lowering the sweetening power of sucrose by incorporating trehalose into sucrose in an amount of 2–12% to the sucrose, d.s.b. The present saccharide compositions and food products improve the aftertaste of sucrose without lowering the sweetening power. The present invention improves the aftertaste of sucrose now used as a sweetener in large quantities, and this would greatly influence, particularly, on the fields of food products such as sweetener, beverage, and processed-food industries, and it would be a great industrial significance.

While there has been described what is at present considered to be the preferred embodiments of the invention, it will be understood the various modifications may be made therein, and it is intended to cover in the appended claims all such modifications as fall within the true spirit and scope of the invention.

We claim:

1. A saccharide composition in which the aftertaste of sucrose in the mouth resulting from the sweetness of sucrose is reduced, said saccharide composition comprising sucrose, trehalose, and one or more members selected from the group consisting of invert sugars, α-galactosyl sucrose, α-glycosyl sucrose, maltosylsucrose, maltooligosaccharides, COUPLING SUGAR™ (saccharides containing maltooligosaccharides couples with sucrose), α-galactosyl sucrose, lactosucrose, NYUKAOLIGO™ (saccharides containing lactose coupled with sucrose), α-glycosyl stevioside, and L-aspartyl-L-phenylalanine methyl ester, wherein said sucrose is present in an amount of at least 10 w/w % of said saccharide composition on a dry solid basis and said trehalose is present in an amount of 2–12 w/w % of said sucrose on a dry solid basis without lowering the sweetness of said sucrose.

2. The saccharide composition according to claim 1 which is in the form of a solid, paste, or liquid.

3. A method for reducing the aftertaste of sucrose in the mouth resulting from the sweetness of sucrose in a food product, said food product comprising at least 40 w/w % of sucrose and a food material, said method comprising the steps of:

a. providing a liquid saccharide composition which comprises trehalose, sucrose, and at least one member selected from the group consisting of invert sugars, alpha-galactosyl sucrose, alpha-glycosyl sucrose, maltosylsucrose, maltooligosaccharides, COUPLING SUGAR™ (saccharides containing maltooligosaccharides coupled with sucrose), alpha-galactosyl sucrose, lacto sucrose, NYUKAOLIGO™ (saccharides containing lactose coupled with sucrose), alpha-glycosyl stevioside, and L-aspartyl-L-phenylalanine methyl ester, wherein the trehalose is present in an amount of 2–8 w/w % of said sucrose on a dry solid basis without lowering the sweetness of said sucrose; and b. adding to said food product said liquid saccharide composition.

4. A food product containing the saccharide composition of claim 1 and another food material.

5. The food product produced according to the method of claim 3.

* * * * *